United States Patent [19]

Kakimoto

[11] Patent Number: 5,269,020
[45] Date of Patent: Dec. 7, 1993

[54] SYSTEM FOR SCHEDULING DATABASE TRANSACTIONS DISTRIBUTED OVER A NETWORK AT A LOCKTIME OF PRESET DELAY

[75] Inventor: Mitsuru Kakimoto, Kanagawa, Japan

[73] Assignee: Kabushiki Kaisha Toshiba, Kanagawa, Japan

[21] Appl. No.: 714,905

[22] Filed: Jun. 17, 1991

[30] Foreign Application Priority Data

Jun. 18, 1990 [JP] Japan .................. 2-157492

[51] Int. Cl.$^5$ .............................................. G06F 15/40
[52] U.S. Cl. ............................. 395/600; 364/DIG. 1; 364/282.1; 364/281.8; 364/281.3; 364/271; 364/246.8; 395/650; 395/550
[58] Field of Search ............... 364/200; 395/650, 425, 395/725, 600, 550

[56] References Cited

U.S. PATENT DOCUMENTS

| 4,096,561 | 6/1978 | Trinchieri | 364/200 |
|---|---|---|---|
| 4,648,036 | 3/1987 | Gallant | 364/300 |
| 4,819,159 | 4/1989 | Shipley et al. | 364/200 |
| 4,853,843 | 8/1989 | Ecklund | 364/200 |
| 4,881,166 | 11/1989 | Thompson et al. | 364/200 |
| 4,887,204 | 12/1989 | Johnson et al. | 364/200 |
| 4,914,570 | 4/1990 | Peacock | 364/200 |
| 4,956,772 | 9/1990 | Neches | 395/650 |
| 4,989,733 | 1/1991 | May et al. | 395/550 |
| 5,095,421 | 3/1992 | Freund | 395/650 |
| 5,140,685 | 8/1992 | Sipple et al. | 395/425 |
| 5,161,227 | 11/1992 | Dias et al. | 395/650 |
| 5,168,570 | 12/1992 | Eckert et al. | 395/725 |

OTHER PUBLICATIONS

Concurrency Control and Recovery in Database Systems by P. A. Bernstein, Vassos Hadzilacos and Nathan Goodman, pp. 76-87, Addison-Wesley, 1987.

Primary Examiner—Thomas C. Lee
Assistant Examiner—Wayne Amsbury
Attorney, Agent, or Firm—Finnegan, Henderson, Farabow, Garrett & Dunner

[57] ABSTRACT

A database management system has a plurality of nodes each having a computer, a database and a clock. The nodes are interconnected by a communication line. Each database stores a plurality of data for processing. When a transaction request is generated at a first node, a transaction management section of the first node computer determines which node database(s) includes necessary data for executing the transaction. A maximum delay decision section of the first node computer determines the maximum delay for sending an instruction to all of the nodes having necessary data. A locktime decision section of the first node computer determines a locktime according to the maximum delay determined and the current time of the clock. Then, a transaction management section of the first node computer sends the locktime through the communication line as a lock instruction to the node(s) having the necessary data. A scheduler section of the computer in the node(s) having the necessary data receives the lock instruction sent by the transaction management section of the first computer. An associated lock activation section activates the scheduler section when the locktime coincides with the current time of the clock. The scheduler section locks the necessary data in the database in response to activation by the lock activation section.

8 Claims, 8 Drawing Sheets

SYSTEM FOR SCHEDULING DATABASE TRANSACTIONS DISTRIBUTED OVER A NETWORK AT A LOCKTIME OF PRESET DELAY

BACKGROUND OF THE INVENTION

1. Field of the Invention

The present invention relates to a database management system for locking data in a plurality of databases during the execution of a transaction.

2. Discussion of the Related Art

A plurality of computers can be arranged in a distributed database system, each computer having a database. The plurality of computers are interconnected by communication lines. Each computer manages its own database (computer and associated own database are called "node" herein). When a node is supplied with a data processing request through an input device, the computer in the node checks which database includes the necessary data for the requested processing, by referring to a table of stored data names nd corresponding locations. If the data is included in the node's own database, the computer reads the data from this database, executes the data processing program and writes the result into the database (a series of such processes is called a "transaction"). If some data is included not only in the node's own database but also in a database of a second node, the computer sends the processing request to the second node, the database of which includes the data. The computer at the second node then reads the data from its database, executes the data processing at its node and writes the data processing result to its database, according to the processing request. In such cases, during processing of the transaction by using the data in the database, other computers at other nodes must not access the same data to execute the other transaction. If the other computer accesses the same data, the resultant data in the database will be inconsistent.

For example, FIG. 1 shows an example of two computers attempting to access the same data item. For instance assume the node is the branch of a bank and its database stores the deposit balance. When the node receives money from the user, a transaction takes place. The deposit balance is read from user's account, the received money is added to the deposit balance and the result is written to his account. Assume that the database of node A stores the user X's deposit balance of $50 and a deposit of $100 is received at node A deposited by user X (this transaction is called Ta). Immediately thereafter, assume that another node B receives $30 for user X's account deposited by user Y (this transaction is called Tb). First, the computer at node A executes READ(Ta). As user X's deposit balance is $50, the computer adds the received $100 to $50 and writes $150 as being the current balance. (WRITE(Ta)). However, the computer at node B executes READ (Tb) before WRITE(Ta). The computer at node B reads user X's deposit balance of $50 through the communication line. Then, the node B computer adds the $30 received to $50 and writes $80 in user X's account as the balance (WRITE (Tb)). Therefore, user X's deposit balance will be $80. However, actually user X's deposit balance should be $180.

Therefore, in the prior art, a lock method is used to prevent occurrence of this type of problem. According to this method, before the computer at node A executes READ(Ta), the computer at node A sets a flag corresponding to user X's account in database A. This flag prohibits access by other computers. When the computer at node A finishes WRITE(Ta), the computer of node A resets the flag corresponding to user X's account in database A. Therefore, during the execution of transaction (Ta), the computer at node B delays executing transaction (Tb) because a flag corresponding to user X's account is set. After the flag is reset by the computer at node A, the computer at node B executes transaction (Tb). The lock method prevents generating incorrect data. However, in the lock method, a so-called deadlock between a plurality of transactions can occur. FIG. 2A, 2B, 2C and 2D show an example of how deadlock between two transactions can occur. It is assumed that transaction A begins to lock other transactions out from two data i and j; transaction B also begins to lock out other transactions from the two data i and j, too. The lock operation is executed as follows.

(1) transaction A locks data item i (FIG. 2A).
(2) transaction B locks data item j (FIG. 2B).
(3) transaction A tries to lock data item j, but must wait until data item j is released (FIG. 2C).
(4) transaction B tries to lock data item i, but must wait until data item i is released (FIG. 2D).

When both transactions A and B must wait until a required data item is released by the other transaction, as in this example, dead lock occurs. In this case, the cause of the deadlock is that transaction B has locked data item j before transaction A was able to lock data item j. However, if only one of transactions A and B locks both data items i and j at the same time, such a deadlock between transactions will not happen. When the first transaction releases data items i and j, the other transaction can lock both data items i and j. In short, deadlock does not occur. In such a case, two possible sequences can occur.

FIG. 3A shows the first sequence as follows:
(1) transaction A locks out other transactions from data items i and j at the same time.
(2) transaction B tries to lock out data items i and j, but must wait until transaction A releases data items i and j.

FIG. 3B shows the second sequence as follows:
(1) transaction B locks out other transactions from data items i and j at the same time.
(2) transaction A tries to lock out data items i and j, but must wait until transaction B releases data items i and j.

In these two situations, one transaction gains exclusive access to both data items i and j. Therefore, the transaction finishes before the two data items i and j are released. Only then can the other transaction gain access to both data items i and j.

However, in a distributed database system, the locking procedure is executed through communication lines between databases. For example, it is assumed that data items i and j are included in database A and B respectively, node A includes computer A and database A, node B includes computer B and database B. Accordingly, transaction of computer A locks out other transactions from data item j in database B later than when transaction of computer A locks data item i in database A because there is a communication delay between computer A and database B. Likewise, when transaction of computer B locks data item i in database A later than when transaction of computer B locks data item j in database B because there is communication delay between computer B and database A. Therefore, in prior art data base management systems, it is difficult for a transaction to lock out the other transactions from plural data items in distributed databases at the same time.

SUMMARY OF THE INVENTION

It is an object of the present invention to provide a database management system for effectively locking onto plural data items in distributed databases at the same time.

These and other objects of the present invention are accomplished by a database management system, comprising a plurality of nodes respectively having a computer, a database and a clock and communication means for interconnecting the plurality of nodes for communicating between nodes. In this system each database stores data for processing, and each computer includes transaction generation means for generating a transaction; transaction management means for examining which database includes the necessary data for executing the transaction generated by the transaction generation means; maximum delay decision means for determining maximum delay to send n instruction to the node having the database examined by the transaction management means; and locktime decision means for determining locktime according to the maximum delay determined by the maximum delay decision means and current time of the clock. The transaction management means sends the locktime as a lock instruction to the node where the database is examined through the communication means; scheduler means receives the lock instruction sent by the transaction management means; lock activation means activates the scheduler means when locktime of the lock instruction coincides with current time of the clock; and the scheduler means locks the necessary data in the database in response to activation by the lock activation means.

DESCRIPTION OF THE PREFERRED EMBODIMENTS

Figure 1:
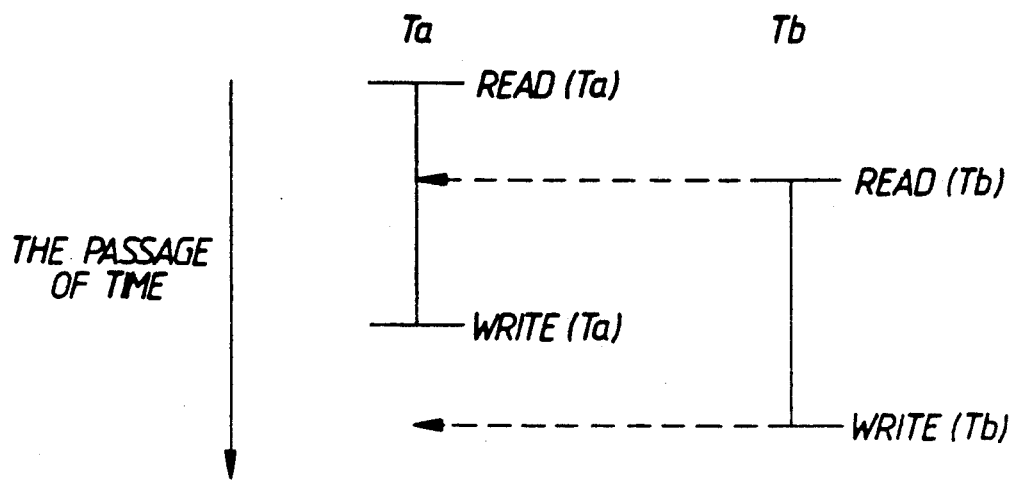
FIG. 1 shows an example of two transactions which require accessing one database according to the prior art.
Figures 3A, 3B:
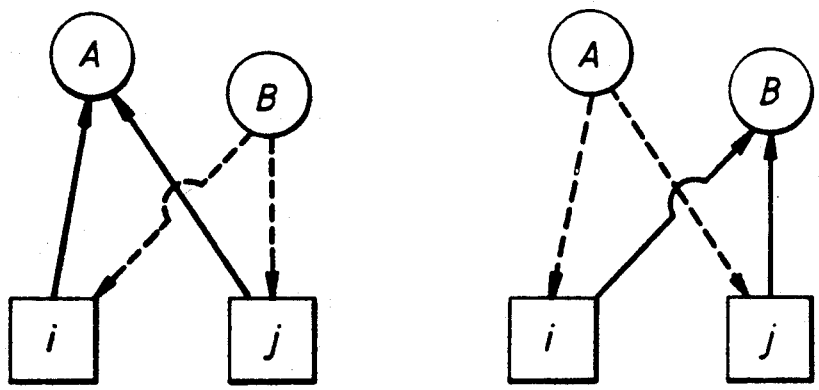
FIG. 3A and 3B show examples which avoid deadlock between two transactions.
Figure 2A:
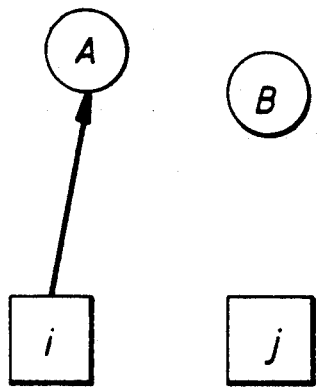
FIG. 2A,, 2B, 2C and 2D show an example of deadlock between two computers attempting to process two transactions.
Figure 2B:
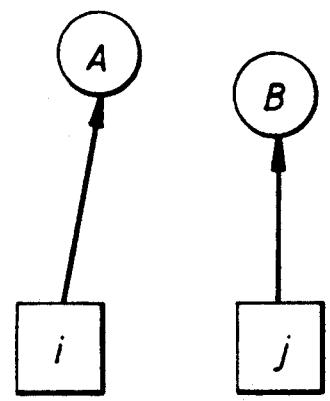
Figure 2C:
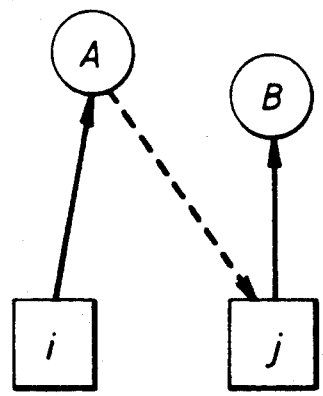
Figure 2D:
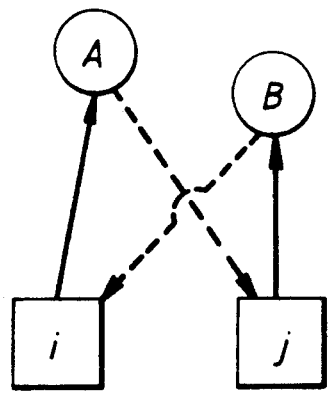
Figure 4:
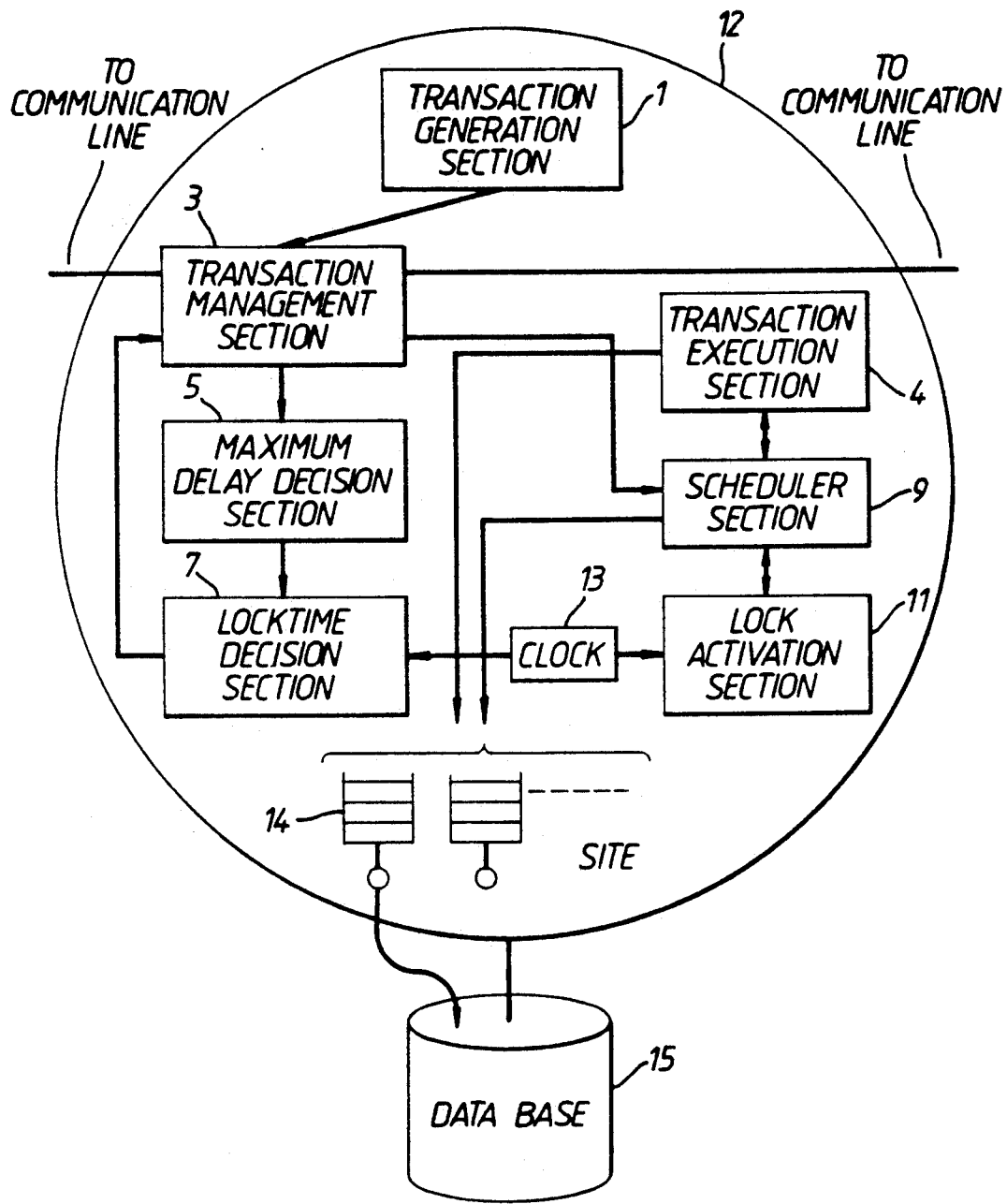
FIG. 4 shows a block diagram of a single site of the database management system according to the present invention.

FIG. 4 shows a block diagram of a node of the database management system according to the present invention. Each node has a computer 12 and a database 15. Each computer consists of a transaction generation section 1, a transaction management section 3, a transaction execution section 4, a maximum delay decision section 5, a locktime decision section 7, a scheduler section 9, a lock activation section 11, a clock 13 and a queue 14. In a plurality of the nodes, the node where the transaction is generated through the transaction generation section 1 is called the "main node." The transaction generation section 1 is an input device such as a keyboard, and the user supplies the transaction request through the transaction generation section 1. The transaction management section 3 analyzes the transaction request and checks which database includes the data necessary for executing the transaction. Then, the transaction management section 3 generates the data structure of the transaction.

Figures 5A, 5B, 5C:
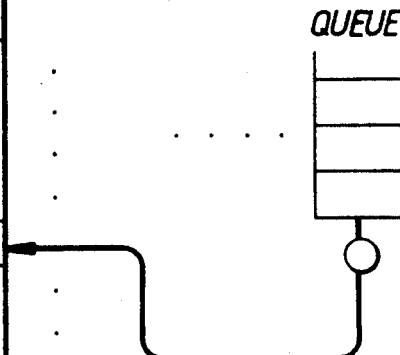
FIG. 5A shows examples of data construction of a transaction.
FIG. 5B shows an example of construction of a lock instruction.
FIG. 5C shows an example of data construction of database and queue.

FIG. 5A shows data construction of the transaction. In this case, user X's account is stored in database A of node A (main node). He orders a transfer of money from his account to user Y's account stored in database B of node B. Two transactions are necessary for user X's order. Transaction (Tx) is to subtract $100 from user X's account in database A. Transaction (Ty) is to add $100 to user Y's account in database B. In this case, transaction execution section 4 of node A executes transaction (Tx) and transaction management section 4 of node A sends transaction (Ty) to node B. Therefore, in advance of the processing of the transactions, user X's account in database A and user Y's account in database B must be locked.

The transaction management section 3 identifies and supplies the database name in which the necessary data is stored to the maximum delay decision section 5. The maximum delay decision section 5 has previously stored the respective delay times required to send instructions to each node in the database management system. Therefore, section 5 selects the delay time corresponding to the node name supplied by the transaction management section 3. If more than one node is involved and data must be obtained from two or more databases, other than at the main node, the maximum delay decision section will select the maximum delay time from among the delay times for each node.

Next, the maximum delay decision section 5 supplies the maximum delay time to the locktime decision section 7. The locktime decision section 7 includes a current time register which always has the current time of clock 13. (The current time register is not disclosed in FIG. 4.) Furthermore, the locktime decision section 7 previously stores error time of clock between main node and the other nodes. The locktime decision section 7 adds the maximum delay and the error time to the current time. This sum of time is called "locktime". Then the locktime decision section 7 supplies the locktime to the transaction management section 3. The transaction management section 3 generates lock instruction by using the locktime. FIG. 5B shows the data construction of the lock instruction. The lock instruction means that the node, which receives the lock instruction, must lock the data item corresponding to the address at the locktime. The transaction management section 3 also sends the lock instruction to other nodes having the data necessary for executing the transaction.

Each node includes a scheduler section 9 which receives the lock instruction which is sent by the transaction management section of another node through the communication line. In the alternative the lock instruction can be sent by the transaction management section of its own node. When the scheduler section 9 receives the lock instruction, the scheduler section 9 sends the locktime of the lock instruction to the lock activation section 11. The lock activation section 11 compares the locktime with the current time of clock 13. When the locktime coincides with the current time of clock 13, the lock activation section 11 sends an activation signal to the scheduler section 9. At that time, the scheduler section 9 locks the data item corresponding to the address of the lock instruction in database 15. If the data item is free (in short, the data item has not been locked), the scheduler section 9 locks the data item immediately.

However, if the data item is not free, the scheduler section 9 waits to execute the lock instruction. The node includes a queue 14 corresponding to each data item respectively in the database. The queue 14 stores lock instructions according to FIFO (first-in first-out). In short, the scheduler section 9 puts the lock instruction from the last row into the corresponding queue. When the data item is released by the transaction execution section 4, the lock instruction, which is located at head row in the corresponding queue, is executed. In short, the scheduler section 9 locks the data item again according to the lock instruction.

FIG. 5C shows the data construction of the database and queue. Database stores the data item and flag corresponding to an address. When the flag is set at "1", it means that the data item is locked. When the flag is reset at "0", it means that the data item is released (free). Each queue corresponds to a respective data item. Accordingly, during the queue process, the lock instruction is stored, and the flag is set repeatedly by the scheduler section 9 whenever the flag is reset by the transaction execution section 4.

Figure 6A:
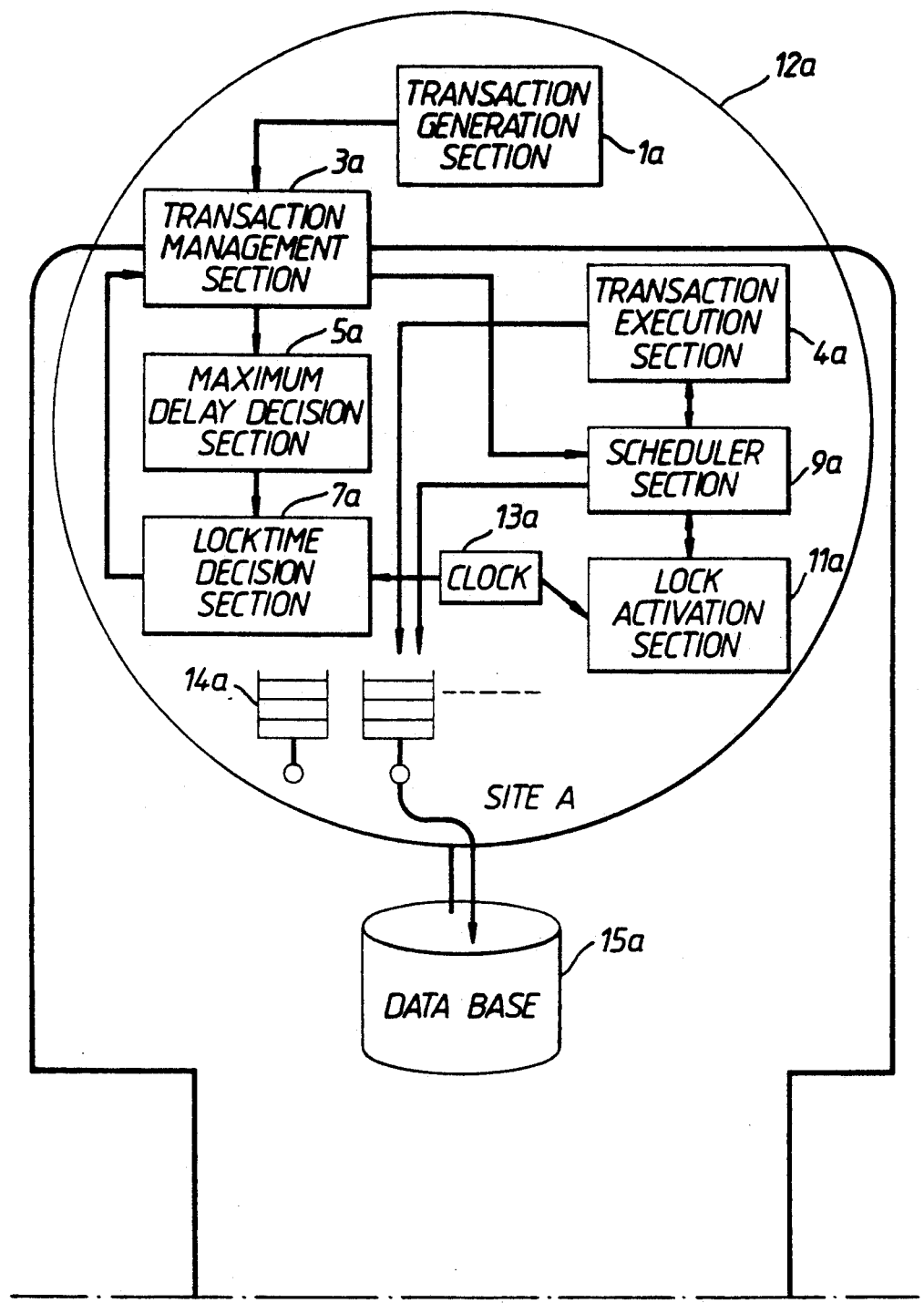
FIG. 6 shows a block diagram of the database management system according to the present invention (each node is in accordance with FIG. 4 although for convenience not all pairs are shown.)
Figure 6B:
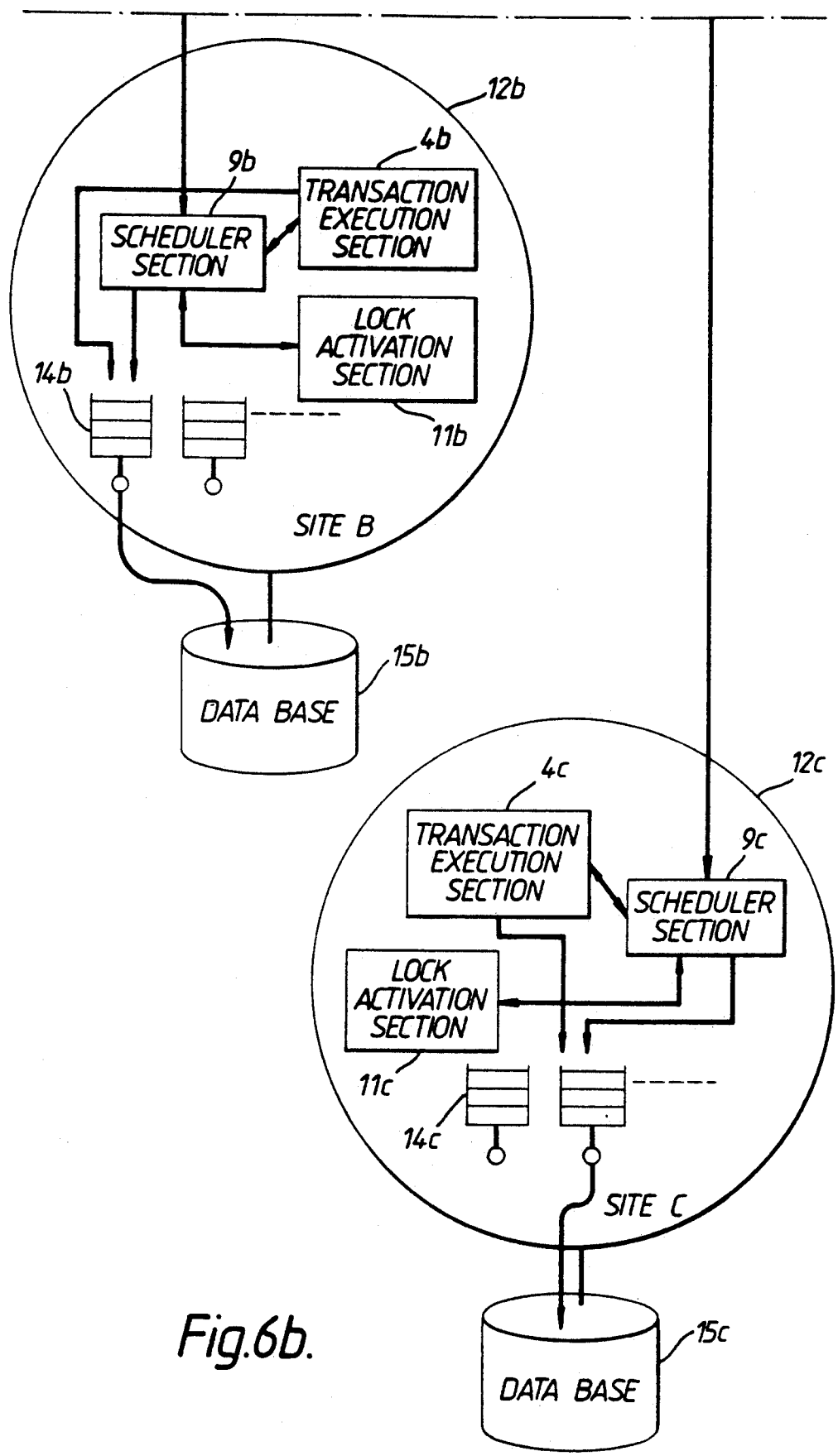
Figure 7:
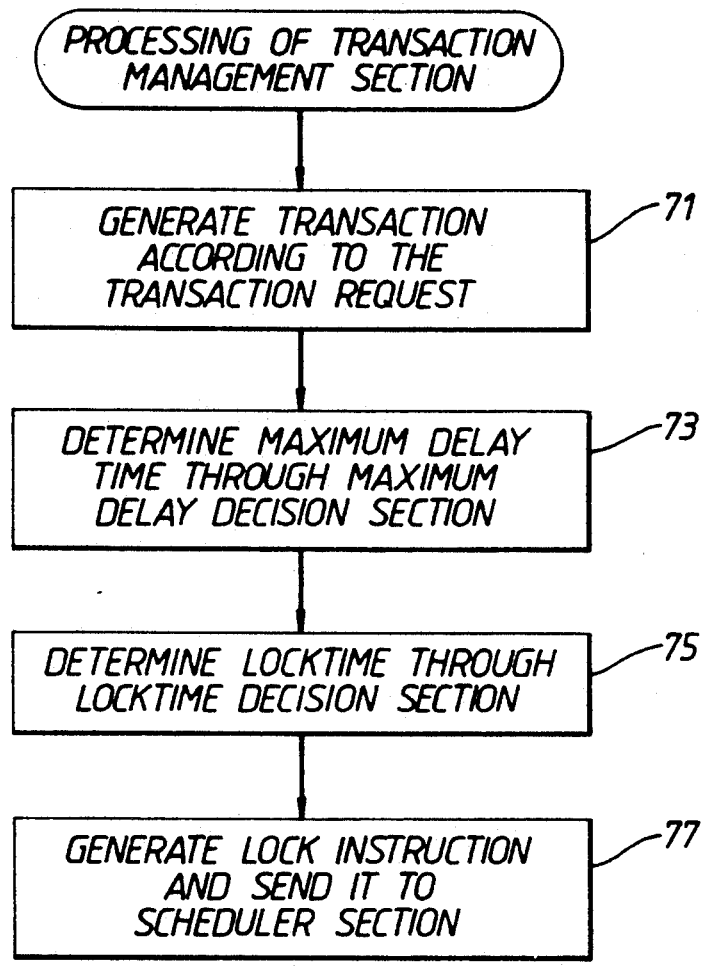
FIG. 7 shows a flow chart of processing of the transaction management section of the database management system according to the present invention.
Figure 8:
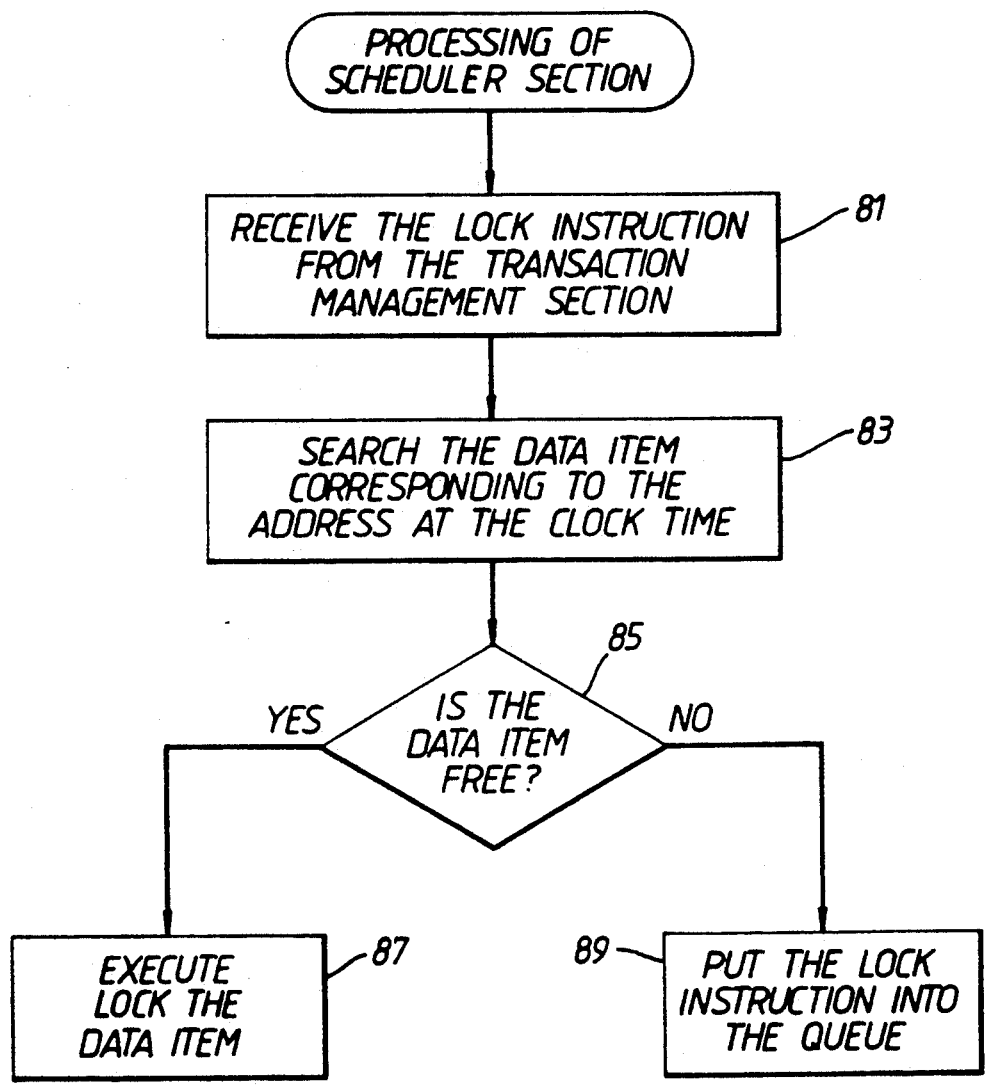
FIG. 8 shows a flow chart for the processing of the scheduler section of the database management system according to the present invention.

FIG. 6 shows a block diagram of a database management system according to the present invention. This database management system consists of the three nodes A, B and C. FIG. 7 shows a flow chart for processing of a transaction by the transaction management section of the main node. FIG. 8 shows a flow chart for processing by the scheduler section of each node. Referring to FIGS. 6, 7 and 8, the processing by the database management system of the present invention is explained in detail. (In node B and node C, it is understood that transaction generation section, transaction management section, maximum delay decision section, locktime decision section and clock are present although omitted in FIG. 6 for purposes of clarity.)

In node A, it is assumed that the transaction request is supplied by transaction generation section 1a of computer 12a and databases 15a, 15b, 15c store the data necessary for executing the transaction. For example, database 15a stores user X's account. Database 15b stores user Y's account. Database 15c stores user Z's account. User X requests transfer of money from his account to user Y's account in the amount of $100 and to user Z's account in the amount of $200 respectively through transaction generation section 1a of node A. According to the transaction request, three transactions (Ta, Tb, Tc) are generated by the transaction management section 3a. Transaction (Ta) is to subtract $300 from user X's account in database 15a. Transaction (Tb) is to add $100 to user Y's account in database 15b. Transaction (Tc) is to add $200 to user Z's account in database 15c. (Step 71 in FIG. 7)

The transaction management section 3a sends the database names (15a, 15b, 15c) to the maximum delay decision section 5a. The maximum delay decision section 5a previously has stored the delay time to send instructions from node A to node B and to node C respectively. Accordingly, the maximum delay decision section 5a determines the maximum delay time ($\theta$) according to the following formula (Step 73 in FIG. 7).

$\theta$ = max (delay (A → B), delay (A → C))
delay (A → B): delay time from node A to node B
delay (A → C): delay time from node A to node C In short, the maximum delay decision section 5 selects the maximum value from the stored delay times. Then, the maximum delay decision section 5 sends the maximum delay time ($\theta$) to the locktime decision section 7a. The locktime decision section 7a includes a current time register in which current time (t) is constantly supplied by a clock 13. (The current time register is not shown in FIG. 6) The locktime decision section 7a previously stores error time ($\delta$) between the clock time of node A and the clock time of nodes B and C. Accordingly, the locktime decision section 7a determines locktime (T) according to the following formula (Step 75 in FIG. 7).

$$T = t + \theta + \delta \quad (1)$$

In short, the locktime decision section 7a adds the maximum delay time ($\theta$) and the error time ($\delta$) to the current time (t). Then, the locktime decision section 7a sends the locktime to the transaction management section 3a. The transaction management section 3a generates a lock instruction by using the locktime and address corresponding to the required data for the transactions. In this case, three lock instructions to lock the data in database 15a, 15b, 15c respectively are generated. Then, the transaction management section 3a sends three lock instructions to scheduler sections 9a, 9b, and 9c respectively. The lock instruction to lock the data item in database 15a is sent to scheduler section 9a. The lock instruction to lock the data item in database 15b is sent to scheduler section 9b. The lock instruction to lock the data item in database 15c is sent to scheduler section 9c (Step 77 in FIG. 7). By using the formula (1) to determine locktime (T), it is assured that the lock instruction reaches nodes B and C before the current time of each clock in nodes B and C and that the database will all be locked simultaneously.

After sending the lock instruction, the transaction management section 3a sends three transactions (Ta, Tb, Tc) to scheduler sections 9a, 9b, 9c respectively. The following explanation applies to processing at node A, but the processing at nodes B and C are the same. When scheduler section 9a receives the lock instruction, the scheduler section 9a sends the locktime of the lock instruction to the lock activation section 11a (Step 81 in FIG. 8). The scheduler section 9a receives transaction (Ta). The scheduler section 9a sends the transaction (Ta) to transaction execution section 4a. The lock activation section 11a includes a current time register in which current time of clock 13a is stored and constantly updated. The lock activation section 11a compares the locktime with current time of the current time register.

When the locktime coincides with the current time, the lock activation section 11a sends signal to the scheduler section 9a. The scheduler section 9a searches the data item corresponding to the address of the lock instruction in database 15a (Step 83 in FIG. 8). The scheduler section 9a checks whether the data item corresponding to the address is free or not (Step 85 in FIG. 8). If the data item is free (flag corresponding to the data item is not set), the scheduler section 9a sets the flag and sends lock completion signal with the data item address to the transaction execution section 4a. The transaction execution section 4a begins to execute transaction (Ta) by using the data item (Step 87 in FIG. 8). If the data item is locked (flag corresponding to the data item is set), the scheduler section 9a puts the lock instruction into the queue 14a corresponding to the data item according to FIFO (First-In First-Out) (Step 89 in FIG. 8). In this case, the transaction execution section 4a is executing another transaction by using the data item. When the transaction execution section 4a finishes the other transaction, section 4a releases the data item (the flag is reset) and sends transaction completion signal with the data item address to the scheduler section 9a. The scheduler section 9a locks the data item corresponding to the address according to lock instruction stored at head row in the queue. In this way, by locking the necessary data item, transaction is executed in order of the locktime.

What is claimed is:

1. A database management system, comprising:
    a plurality of nodes respectively having a computer, a database and a clock;
    communication means for interconnecting the plurality of nodes to send instructions between the nodes:
    the respective databases storing data for processing;
    each node computer including:
    transaction generation means for generating a transaction;
    transaction management means for determining which node has the database that includes necessary data for executing the transaction generated by the transaction generation means;
    delay decision means for determining the delay time required to send an instruction from the transaction generating node to the node having the necessary data;
    locktime decision means for determining a locktime according to the determined delay time and current time of the clock, the transaction management means of the transaction generating node sending the locktime as a lock instruction through the communication means to the node having the necessary data;
    scheduler means for receiving the lock instruction sent by the transaction management means of the transaction generating node;
    lock activation means for activating the scheduler means when the locktime of the lock instruction coincides with current time of the clock;
    transaction execution means for executing the transaction generated by the transaction generating means;
    the scheduler means of the node having the necessary data locking the necessary data in the database in response to activation by the lock activation means;
    said transaction management means of the transaction generating node sending the transaction generated by the transaction generation means through the communication means to the node having the necessary data, following the lock instruction;
    said transaction executing means executing the transaction by using the necessary data in an associated database after the necessary data is locked by the associated scheduler means.

2. The database management system according to claim 1, wherein the transaction execution means of the node having the necessary data unlocks the necessary data in the database when the transaction execution means finishes executing the transaction.

3. The database management system according to claim 2, each computer further including a queue, for temporarily storing lock instructions corresponding to data items on a first-in first-out basis, the scheduler means of the node having the necessary data entering the lock instruction in the queue of the computer of the node having the necessary data, if the necessary data item has already been locked according to a previous lock instruction.

4. The database management system according to claim 3, wherein the scheduler means of the node having the necessary data locks the necessary data according to the lock instruction which is stored at the head row in an associated queue, when the necessary data is released by the transaction execution means.

5. The database management system according to claim 1, wherein the transaction management means of the transaction generating node sends the lock instruction to the scheduler means of its own node is the database of its own node includes necessary data for executing the transaction.

6. The database management system according to claim 1, wherein the delay decision means is a maximum delay decision means for selecting the maximum delay necessary to send the lock instruction to all of multiple nodes each of which has a database including necessary data for executing the transaction.

7. The database management system according to claim 1, wherein the locktime decision means determines locktime by adding to current time of the clock of its own node the delay and a clock error time between the clock of its own node and the clock of a second node having the necessary data.

8. The database management system according to claim 1, wherein the scheduler means of the node having the necessary data immediately locks the necessary data according to the lock instruction when the necessary data is free.

* * * * *